(12) United States Patent
Chang et al.

(10) Patent No.: US 8,847,904 B2
(45) Date of Patent: Sep. 30, 2014

(54) GESTURE RECOGNITION METHOD AND TOUCH SYSTEM INCORPORATING THE SAME

(75) Inventors: Ching-Yang Chang, Jhudong (TW); Hsiang-Cheng Wu, Zhubei (TW)

(73) Assignee: TPK Touch Solutions Inc., Taipei (TW)

( * ) Notice: Subject to any disclaimer, the term of this patent is extended or adjusted under 35 U.S.C. 154(b) by 40 days.

(21) Appl. No.: 13/472,500

(22) Filed: May 16, 2012

(65) Prior Publication Data
US 2013/0027327 A1  Jan. 31, 2013

(30) Foreign Application Priority Data

Jul. 25, 2011 (CN) .......................... 2011 1 0209024

(51) Int. Cl.
*G09G 5/00* (2006.01)
*G06F 3/0488* (2013.01)

(52) U.S. Cl.
CPC .................................. *G06F 3/04883* (2013.01)
USPC ........ 345/173; 345/174; 345/178; 178/18.01; 178/18.05

(58) Field of Classification Search
USPC .................... 345/173–178; 178/18.01–18.06
See application file for complete search history.

(56) References Cited

U.S. PATENT DOCUMENTS

| 8,217,909 B2 * | 7/2012 | Young ........................... 345/173 |
| 8,479,122 B2 * | 7/2013 | Hotelling et al. ............. 715/863 |
| 2008/0309632 A1 * | 12/2008 | Westerman et al. .......... 345/173 |
| 2011/0164029 A1 * | 7/2011 | King et al. .................... 345/419 |
| 2012/0131503 A1 * | 5/2012 | Lin et al. ....................... 715/810 |

FOREIGN PATENT DOCUMENTS

| TW | M350737 | 2/2009 |
| TW | 200925952 | 6/2009 |

* cited by examiner

*Primary Examiner* — Jennifer Nguyen
(74) *Attorney, Agent, or Firm* — Gokalp Bayramoglu

(57) ABSTRACT

Methods and systems for implementing gestures with touch sensing device are disclosed. A gesture recognition method includes: determining whether an input gesture matches a predefined universal gesture based on touch information on a touch panel; and generating a corresponding gesture command set according to an event signal when the input gesture matches the predefined universal gesture.

15 Claims, 7 Drawing Sheets

GESTURE RECOGNITION METHOD AND TOUCH SYSTEM INCORPORATING THE SAME

BACKGROUND OF THE INVENTION

This application claims the benefit of the People's Republic of China Application No. 201110209024.4, filed on Jul. 25, 2011.

FIELD OF THE INVENTION

The present invention relates to touch systems, and more particularly, to a gesture recognition method and a touch system incorporating the same.

DESCRIPTION OF THE RELATED ART

Multiple input devices exist for performing operations in a computer system. Such operations generally correspond to moving a cursor and making selections on a display screen. The operations also include actions such as paging, scrolling, panning, zooming, etc. By way of example, the input devices can include buttons, switches, keyboards, mice, trackballs, touch pads, joy sticks, touch screens and the like.

With touch pad instruments such as a touch pad on a personal laptop computer, movement of an input pointer on a display generally corresponds to relative movements of a user's finger (or stylus) as the finger is moved along a surface of the touch pad. Touch screens, on the other hand, are a type of display screen that can include a touch-sensitive transparent panel that can overlay the display screen. While using a touch screen, a user typically makes a selection on the display screen by pointing directly to objects (such as graphical user interface (GUI) objects) displayed on the screen (usually with a finger).

Recently, more advanced gesture commands have been implemented. For example, scrolling can now be initiated by placing four fingers on the touch pad so that the scrolling gesture is recognized, and thereafter moving these fingers on the touch pad to perform scrolling events. Since new gesture interfaces have been developed, new gesture commands may vary between computing systems and even among applications of the same system. With new gesture commands becoming complex, users may get confused or uncertain about how to interact with a particular gesture recognition program appropriately. For example, a user might touch a window displayed on the touch panel at opposite sides of the window with two fingers and drag each forger towards the other finger. This input could be interpreted by program X as a "close window" command, wherein program Y might interpret this gesture as a "draw line" command. Moreover, as gestures increase in complexity (e.g., by incorporating various combinations of ordered touches, drags, pressure-sensitive touches, etc.), users are becoming more apprehensive and confused about how to enter gestures and knowing how those gestures will be interpreted by the software program.

Therefore, there is a need for developing a system for recognizing gestures with touch devices to afford facilities for users.

SUMMARY OF THE INVENTION

This disclosure relates to a method and a system for recognizing gestures with touch devices to afford facilities for users.

In an embodiment, a gesture recognition method includes: determining whether an input gesture matches a predefined universal gesture based on touch information on a touch panel; and generating a corresponding gesture command set according to an event signal when the input gesture matches the predefined universal gesture.

In another embodiment, the gesture recognition method further includes: determining whether an application program is designated to respond to the event signal. If the application program is designated to respond to the event signal, placing the event signal into an event queue of the application program when the application program is designated to respond to the event signal; and acquiring the event signal from the event queue and displaying the gesture command set corresponding to the application program.

In yet another embodiment, a touch system includes: a touch panel; a touch IC configured to output an event signal while determining an input gesture matches a predefined universal gesture based on touch information on the touch panel; and a processor configured to control an operating system or an application program to generate a corresponding gesture command set according to the event signal. In an embodiment, an operating system is hereinafter, also interchangeably referred to an operation system.

In yet another embodiment, the touch system further includes: a storing unit configured to store the operating system and the application program running thereon. The processor places the event signal into an event queue of the application program if the processor determines that the application program is designated to respond to the event signal, and the application program acquires the event signal from the event queue for displaying the gesture command set corresponding to the application program.

In yet another embodiment, a computer readable storage medium storing one or more programs, wherein one or more programs includes instructions, which when executed by an electronic device with a touch panel, causes the electronic device to: determine whether an input gesture matches a predefined universal gesture based on touch information on the touch panel; and generate a corresponding gesture command set according to an event signal when the input gesture matches the predefined universal gesture.

Additional features and advantages of the present disclosure will be set forth in the description which follows, and in part will be obvious from the description, or may be learned by the practice of the present disclosure. The features and advantages of the present disclosure may be realized and obtained by means of instruments and combinations particularly pointed out in the appended claims. These and other features of the present disclosure will become more fully apparent from the following description and appended claims, or may be learned by the practice of the present disclosure as set forth hereinafter.

BRIEF DESCRIPTION OF THE DRAWINGS

Components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION OF THE EMBODIMENTS

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Methods and systems of implementing gestures with touch sensing device are disclosed. More particularly, a universal gesture is predefined and stored in a touch device. Once an input gesture is identified as matching the universal gesture, a specific event signal outputted from the touch device is sent to a CPU. The CPU determines whether an application program (AP) or an operating system (OS) is designated to respond to the specific event signal according to their geometric features (position, area, or type). The AP or OS generates a corresponding gesture command set presented visually in a way of, for example, a popup window, in order to inform the user the available commands. Embodiments of the present disclosure may be used in a special purpose or general-purpose computer including various computer hardware or modules, as discussed in greater detail below.

Figure 1:
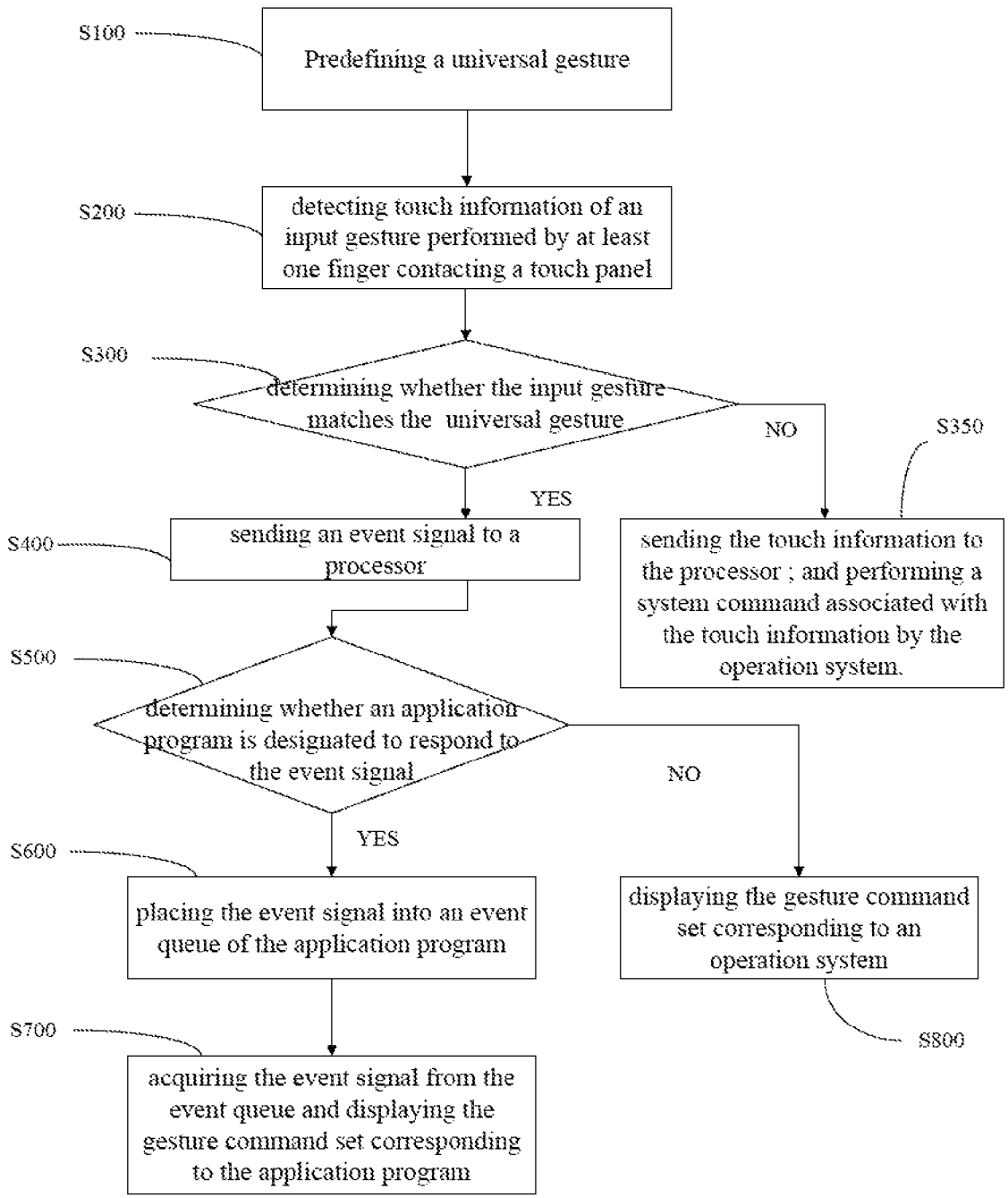
FIG. 1 is a flowchart of an embodiment of a gesture recognition method.

Referring to FIG. 1, a first embodiment of a gesture recognition method is illustrated. The gesture recognition method generally begins at block S100 where a universal gesture is predefined. The universal gesture may be selected from a group comprising of grab, tap, pitch, drag, push, rotate, etc. In this embodiment, one of the universal gestures called "grab" is defined as at least three fingers bend inward simultaneously. The definition of "grab" is stored in an IC and can be read during the operation.

Figure 2:
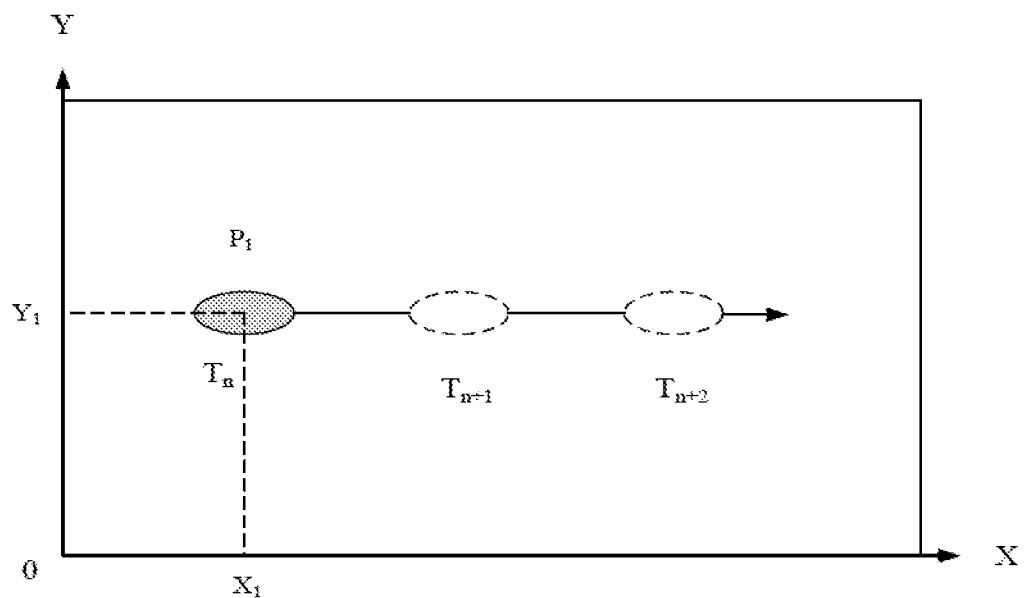
FIG. 2 illustrates an exemplary illustration of touch information of one contact.
Figure 3:
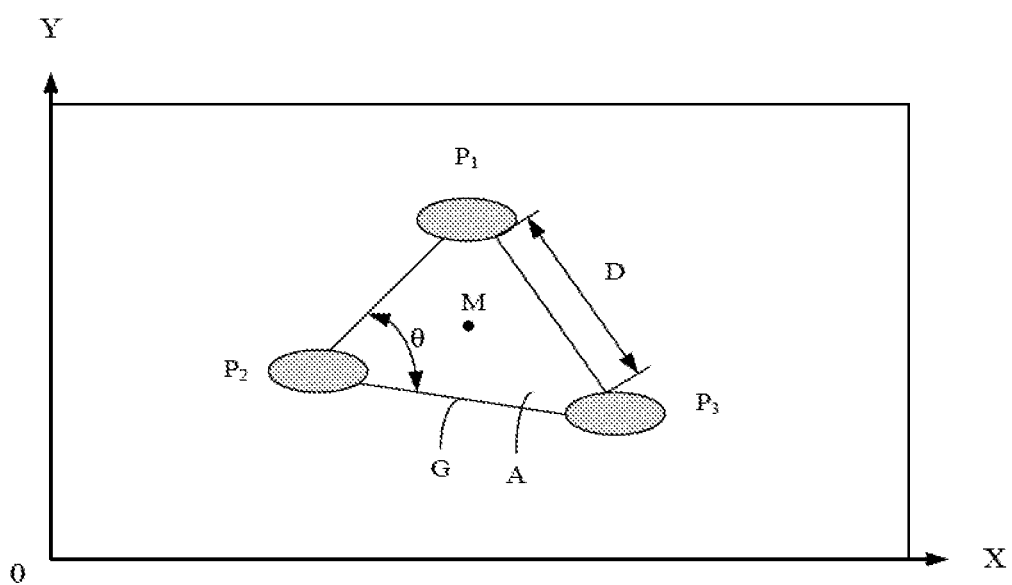
FIG. 3 illustrates an exemplary illustration of touch information of a plurality of contacts.

Following block S100, the method proceeds to block S200 where touch information of an input gesture, which is performed by at least one finger (or stylus) contacting a touch panel, is detected. The touch information may comprise X coordinate and Y coordinate, initial time Tn of appearance, pressure, and moving track of each contact Pi, wherein FIG. 2 shows the moving track of contact Pi. The touch information may also comprise of a distance D of connection lines between two adjacent contacts Pi in one frame, an angle θ formed by two adjacent connection lines, an area A of a polygon G bounded by those connection lines, and coordinates of a centroid M of the polygon G, as shown in FIG. 3.

The method proceeds to block S300 where a determination is made as to whether or not the input gesture matches the predefined universal gesture according to the touch information. If the input gesture does not match the universal gesture, the method proceeds to block S350 where the touch information is sent to a processor, and a system command associated with the touch information is performed by the operating system. If the input gesture matches the universal gesture, the method proceeds to block S400 where an event signal is sent to the processor.

Figure 4:
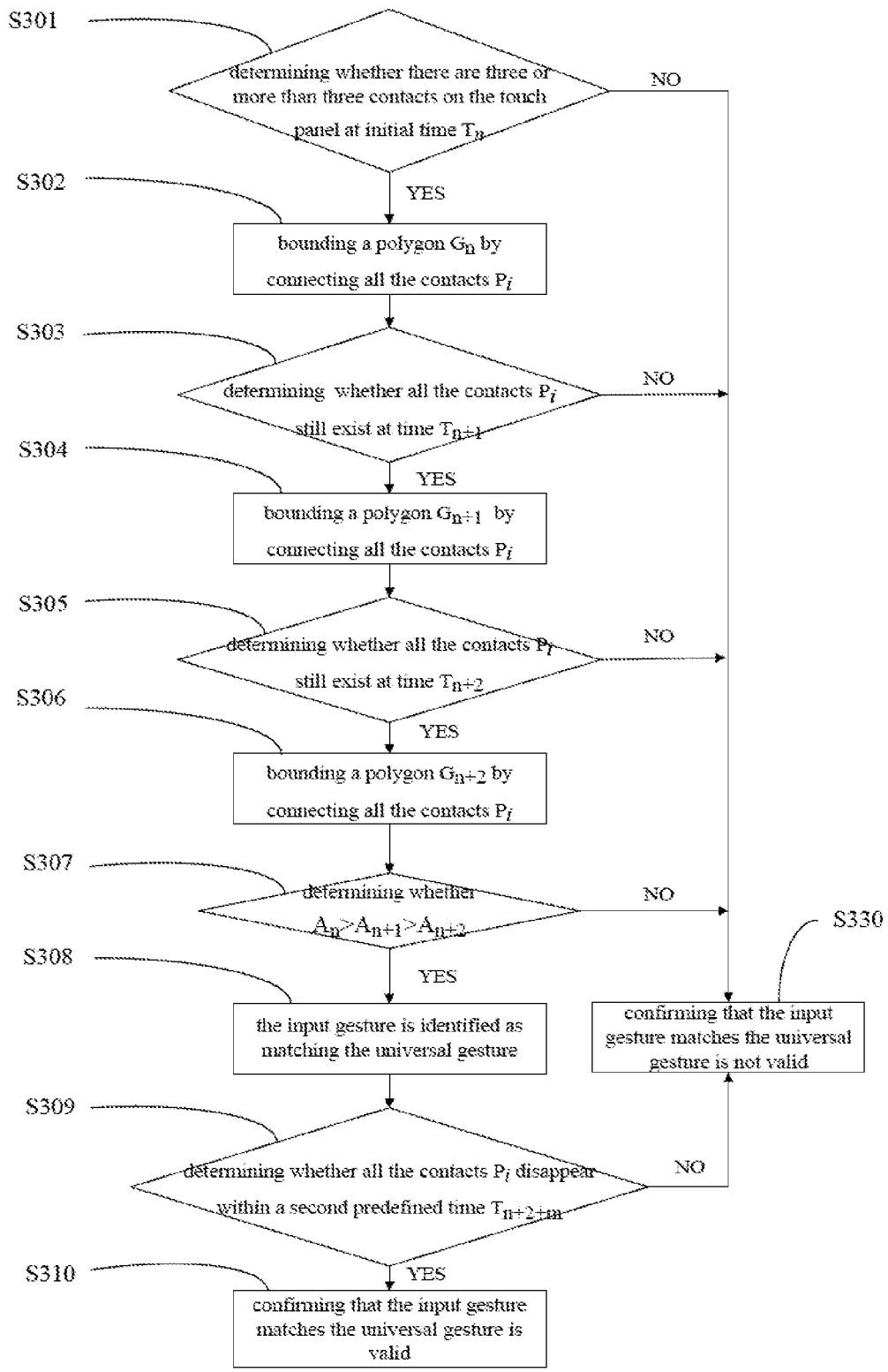
FIG. 4 is a flowchart of an embodiment of method for determining whether the input gesture matches a predefined universal gesture based on the touch information.

The determination process in block S300 can be widely varied and may depend on many factors of the touch information. Two methods are disclosed below for illustration only. Referring to FIG. 4, a first method for determining whether the input gesture matches the predefined universal gesture begins at block S301 where a determination is made as to whether there are at least three contacts on the touch panel at initial time Tn, in other words, to determine whether i (number of contacts Pi)≥3, usually i≤5.

In an embodiment, if there are less than three contacts, which means only one or two fingers touch the panel, the method proceeds to block 330 confirming that the input gesture does not match with the universal gesture i.e the matching is not valid. The method then proceeds to block S350 where the touch information is sent to the processor, and a system command, such as select or move, associated with the touch information is performed by the operating system. If there are three or more contacts, the method proceeds to block S302 where a polygon Gn is bounded by connecting adjacent contacts Pi.

The method then proceeds to block S303 where a determination is made as to whether all the contacts Pi still exist at time Tn+1. Interval between time Tn+1 and time Tn is one frame, which is determined by a scanning frequency of the touch panel. If at least one of the contacts Pi disappears within time Tn+1, the method proceeds to block S330.

If all the contacts Pi exist at time Tn+1, the method proceeds to block S304 where a polygon Gn+1 is bounded by connecting adjacent contacts Pi in one frame.

The method then proceeds to block S305 where a determination is made as to whether all the contacts Pi still exist at time Tn+2. The interval between time Tn+2 and Tn+1 is also one frame. If at least one of the contacts Pi disappears within time Tn+2, the method proceeds to block S330.

If all the contacts Pi exist at time Tn+2, the method proceeds to block S306 where a polygon Gn+2 is bounded by connecting adjacent contacts Pi in one frame.

The method then proceeds to block S307 where a determination is made as to whether area An of the polygon Gn exceeds area An+1 of the polygon Gn+1, and whether the area An+1 of the polygon Gn+1 exceeds area An+2 of the polygon Gn+2. In other words, if all the contacts Pi remain within a first predefined time (three frames in this embodiment), a determination is made as to whether the area of the polygon is decreasing as time elapses i.e. whether the area of the polygon is in inverse proportion to time. The areas An, An+1, and An+2 can be calculated according to the coordinates of the contacts Pi by existing methods.

Figure 7:
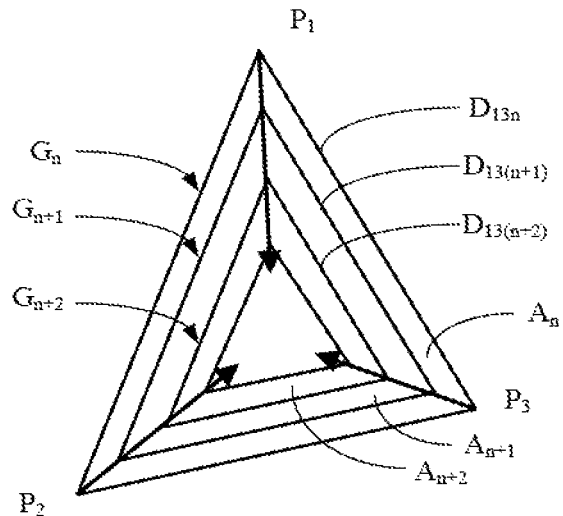
FIG. 7 to FIG. 9 illustrate examples of a universal gesture with different number of fingers.
Figure 8:
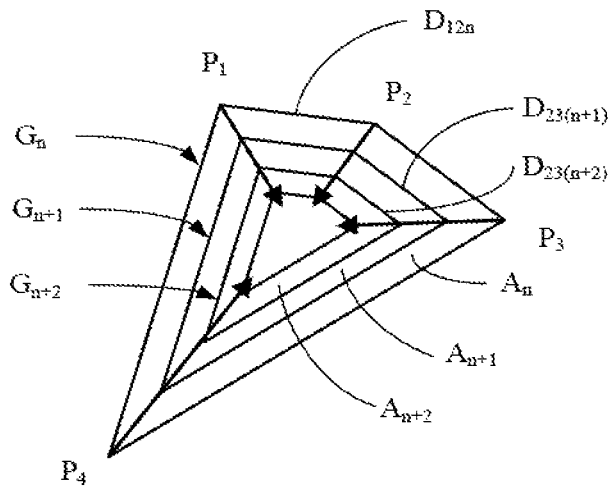
Figure 9:
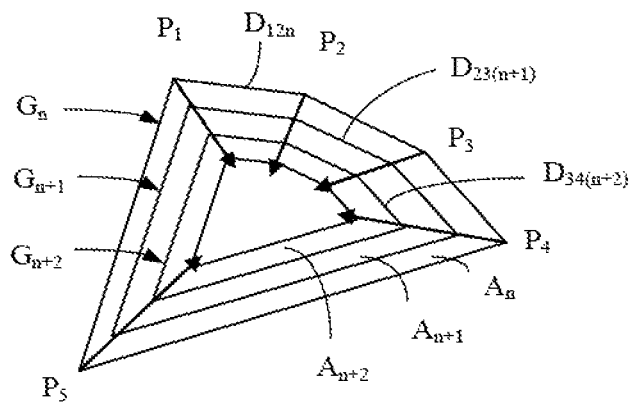

When the result of determination in block S307 is true, the method proceeds to block S308 where the input gesture is identified as matching the universal gesture. Referring to FIG. 7 to FIG. 9, when An>An+1>An+2, in other words, all the contacts are approaching each other and the input gesture is identified as matching the universal gesture "grab". If the result of determination in block S307 is false, the method proceeds to block S330.

As illustrated above, it only takes data of three frames (Tn, Tn+1, Tn+2) to determine whether or not a user performs the universal gesture. It is to be understood that, in order to obtain more precise results, the first predefined time can be extended by increasing the number of frames.

In the illustrated embodiment, the method further includes block S309 following block S308 where a determination is made as to whether all the contacts Pi further disappear within a second predefined time Tn+2+m, where m can be any natural number. If all the contacts Pi disappear, which means all the fingers leave the touch panel after Tn+2 and within Tn+2+m, the method proceeds to block S310 confirming that the input gesture matches the universal gesture is valid. If the result of determination is false, which means at least one finger remains in contact with the touch panel over the second predefined time Tn+2+m, the method proceeds to block S330 confirming that the input gesture matches the universal gesture is not valid.

Figure 5:
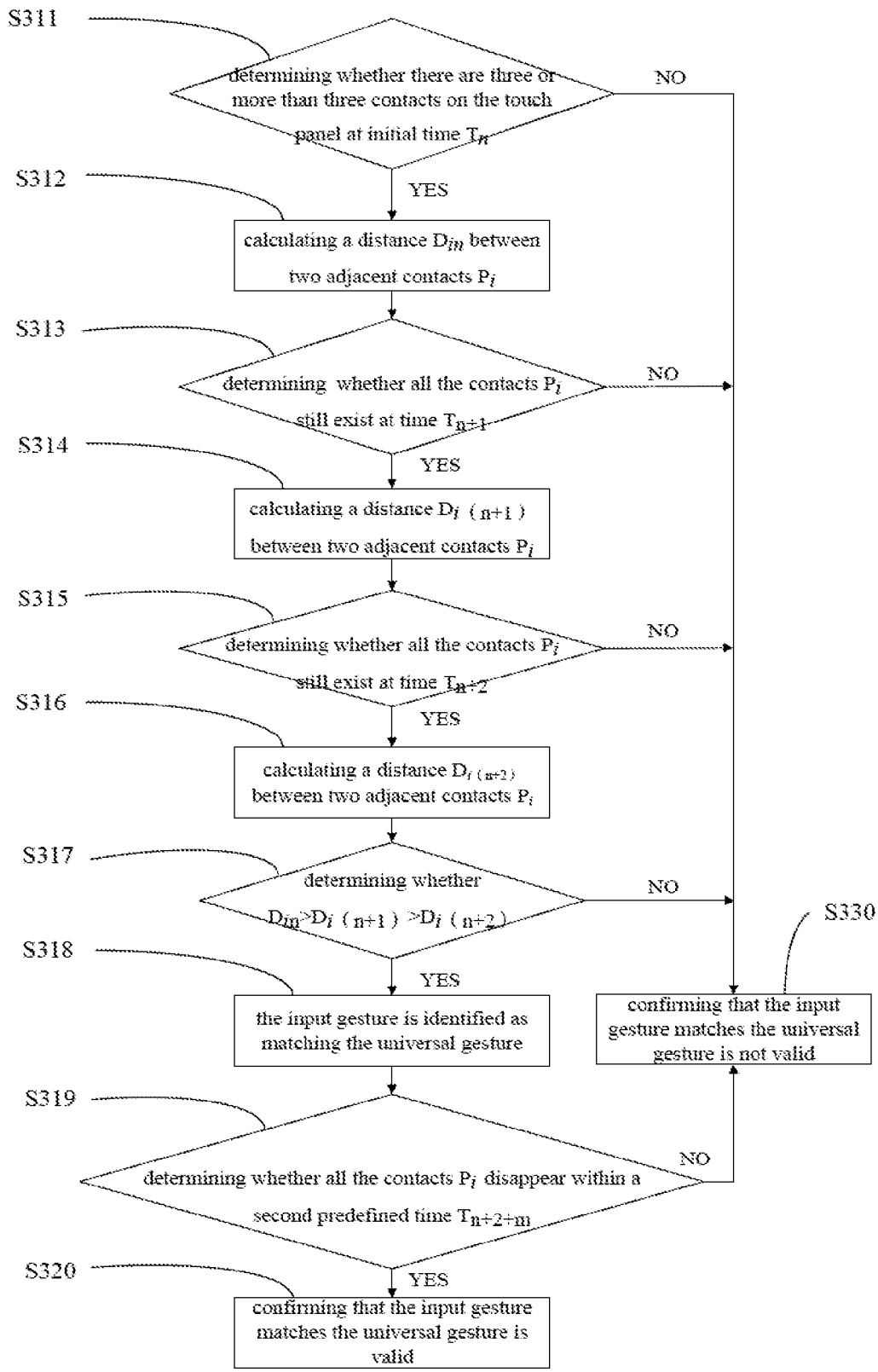
FIG. 5 is a flowchart of an another embodiment of method for determining whether the input gesture matches a predefined universal gesture according to the touch information.

Referring to FIG. 5, a second method for determining whether the input gesture matches the predefined universal gesture begins at block S311 where a determination is made as to whether there are at least three contacts on the touch panel at an initial time Tn. In other words, it is determined as to whether i (number of contacts Pi)≥3, usually i≤5.

If there are less than three contacts, which means only one or two fingers touch the panel, the method proceeds to block 330 confirming that the input gesture matching the universal gesture is not valid. The method then proceeds to block S350 where the touch information is sent to a processor; and a system command, such as select or move, associated with the touch information is performed by the operating system. If there are at least three contacts, the method proceeds to block S312 where distances Dijn between two adjacent contacts Pi in one frame are calculated.

The method then proceeds to block S313 where a determination is made as to whether all the contacts Pi still exist at time Tn+1. The interval between time Tn+1 and Tn is one frame, which is determined by a scanning frequency of the touch panel. If at least one of the contacts Pi disappears within time Tn+1, the method proceeds to block S330.

If all the contacts Pi exist at time Tn+1, the method proceeds to block S314 where a distance Dij (n+1) between two adjacent contacts is calculated.

The method then proceeds to block S315 where a determination is made as to whether all the contacts Pi still exist at time Tn+2. The interval between time Tn+2 and Tn+1 is also one frame. If at least one of the contacts Pi disappears within time Tn+2, the method proceeds to block S330.

If all the contacts Pi exist at time Tn+2, the method proceeds to block S316 where a distance Dij (n+2) between two adjacent contacts is calculated.

The method then proceeds to block S317 where a determination is made as to whether Dij (n+1) exceeds Dijn, and whether Dij (n+2) exceeds Dij (n+1). In other words, determination is made as to whether the distance between two adjacent contacts is decreasing as time elapses, that is, if the distance between two adjacent contacts is in inverse proportion to time. In an embodiment, this determination is made if all the contacts Pi remain during a first predefined time (three frames in this embodiment).

When the result of the determination in block S317 is true, the method proceeds to block S318 where the input gesture is identified as the universal gesture. Referring to FIG. 7 to FIG. 9, when Dij (n+2)>Dij (n+1)>Dijn, in other words, all the contacts approach each other and form a universal gesture of gab. If the above inequality is not satisfied, it means that at least one finger moves away from other fingers, and it is determined that the user fails to perform the universal gesture. If the result of the determination in block S317 is false, the method proceeds to block S330.

In the illustrated embodiment, the method further includes block S319 following block S318 where a determination is made as to whether all the contacts Pi further disappear within a second predefined time Tn+2+m, where m can be any natural number. If all the contacts Pi disappear, which means all the fingers leave the touch panel after Tn+2 and within Tn+2+m, the method proceeds to block S320 confirming that the input gesture matches the universal gesture is valid. If the result of the determination is false, which means that at least one finger remains in contact with the touch panel over the second predefined time Tn+2+m, the method proceeds to block S330 confirming that the input gesture matches the universal gesture is not valid In an alternative embodiment, for the purpose of precise determination, a determination step can be added between frames as to whether an angle formed by two connection lines connecting one contact with two adjacent contacts remains the same. In other words, an input gesture can only be identified as the universal gesture when the fingers move linearly.

As described above, the input gesture is confirmed to match the predefined universal gesture and is valid when block S310 or S320 proceeds. Referring to FIG. 1 again, the method then proceeds to block S400 where the event signal is sent to the processor.

The event signal consists of data below:
Type: length=2 bits, 01=3 fingers; 10=4 fingers; 11=5 fingers;
Area: length=14 bits, range=0~16384;
Position: length=16 bits, range=0~65535.

In addition, the method proceeds to block S500 where a determination is made as to whether an application program is designated to respond to the event signal based on the data of the event signal.

Figure 6:
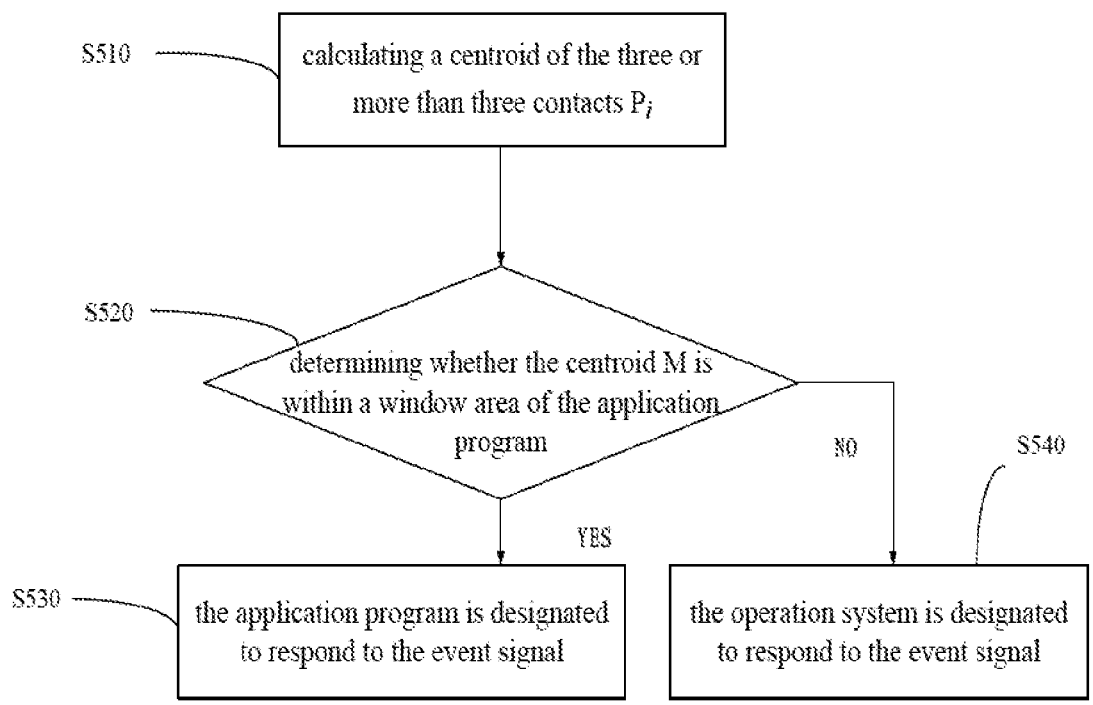
FIG. 6 is a flowchart of an embodiment of method for determining whether an application program is designated to respond to the event signal.

Referring to FIG. 6, an embodiment of determination method of block S500 begins at block S510 where a centroid of at least three contacts Pi is calculated.

The centroid can be calculated by various methods. For example, the centriod can be a geometric center of the polygon Gn bounded by connecting adjacent sides of the contacts Pi. If (Xi, Yi) represent coordinates of each contact Pi, wherein i=1, 2, 3 . . . n, n≥3, then a coordinate of the centroid M is $$\left(\frac{\sum_{i=1}^{n} x_i}{n}, \frac{\sum_{i=1}^{n} y_i}{n}\right).$$

In an alternative embodiment, the centroid M may be a center of an inscribed circle or circumcircle of the polygon Gn. The centroid 1\4 may also be determined based on the shape of the contact area or the pressure.

The method proceeds to block S520 where a determination is made as to whether the centroid M is within a window area of the application program. The window of the application program usually covers part of the desktop of the operating system. If the centroid M is positioned within the window area of the application program, which means that a user is operating the application program, the method proceeds to block S530 where the application program is designated to respond to the event signal. If the centroid M is positioned outside the window area of the application program, which means that the user is operating the operating system, the method proceeds to block S540 where the operating system is designated to respond to the event signal and then proceeds to block S800 shown in FIG. 1.

Following block S530 where the application program is designated to respond to the event signal, the method proceeds to block S600 shown in FIG. 1 where the event signal is placed into an event queue of the application program. In addition, those skilled in the art will readily appreciate that the event signal is packaged to an appropriate form before being transmitted between the application program and the operating system.

The method proceeds to block S700 where the event signal is acquired from the event queue and a gesture command set is generated and displayed correspondingly on an interface of the application program. The gesture command set may be a map that links actions to gesture events and may include a variety of GUI elements. A user can select and use these GUI elements to perform various commands. Examples of such commands include new, open, close, delete, rename, select all, cut, copy, paste, undo, redo, group/ungroup, italic, bold, underline, previous/next, play/pause, mute, etc. It should be appreciated that these examples are not a limitation and that other commands may be used.

If the operating system is designated to respond to the event signal, the method proceeds to block S800 where a gesture command set is generated and displayed correspondingly on an interface of the operating system.

Figure 10:
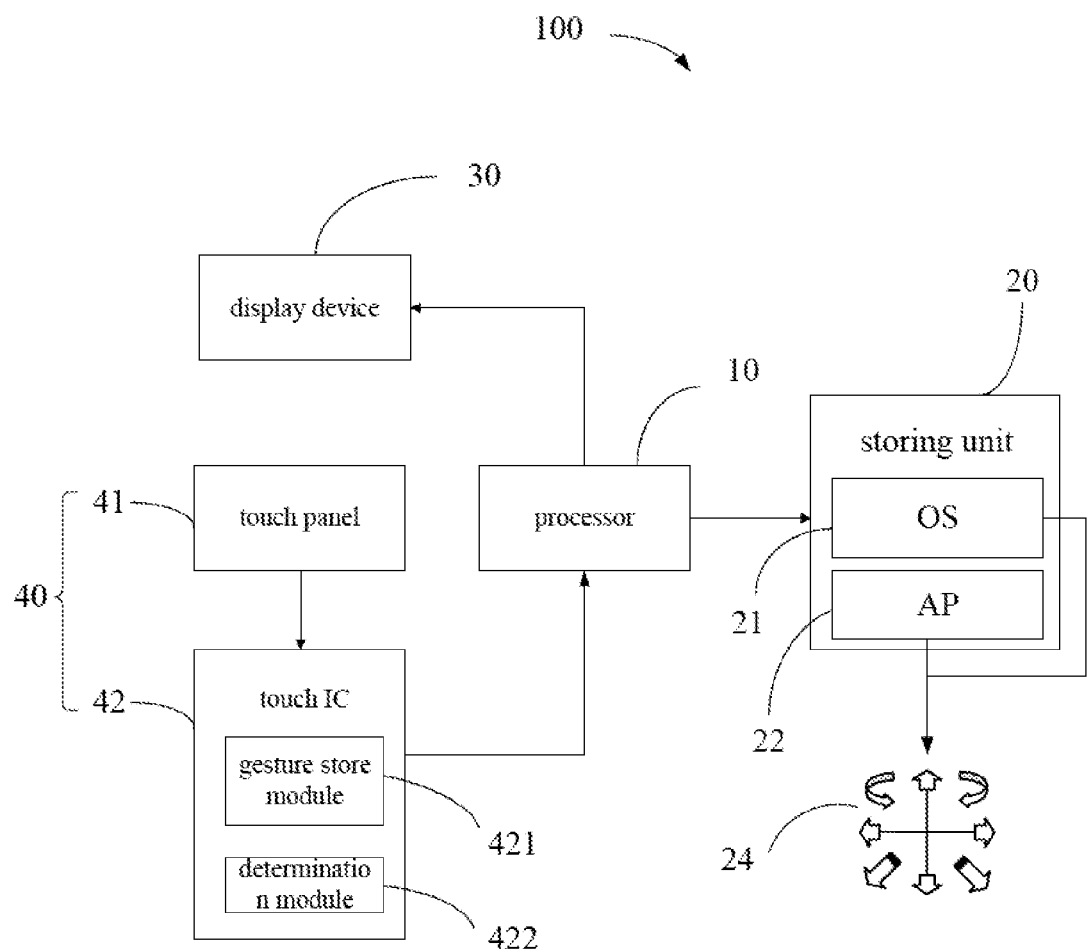
FIG. 10 is a block diagram illustrating an embodiment of a touch system.

FIG. 10 shows an illustrative touch system 100, in accordance with one embodiment of the present disclosure. The touch system 100 may correspond to a computer system such as a personal computer system that includes desktops, laptops, tablets or handheld computers. The touch system 100 may also correspond to other consumer electronic devices such as handheld devices including cell phones, PDAs, dedicated media players, and the like.

The touch system 100 shown in FIG. 10 includes a processor 10 configured to execute instructions and to carry out operations associated with the touch system 100. For example, using instructions retrieved for example from memory, the processor 10 may control the reception and manipulation of input and output data between components of the touch system 100. The processor 10 can be implemented on a single-chip, multiple chips or multiple electrical components. For example, various architectures can be used for the processor 10, including dedicated or embedded processor, single purpose processor, controller, ASIC (Application Specific Integrated Circuit), and so forth.

The touch system 100 shown in FIG. 10 includes a storing unit 20 operatively coupled to the processor 10. The storing unit 20 is configured to provide a place to store computer code and data that are used by the touch system 100. By way of an example, the storing unit 20 may include Read-Only Memory (ROM), Random-Access Memory (RAM), hard disk drive and/or the like. The information can also reside on a removable storage medium and loaded or installed onto the touch system 100 when needed. Removable storage mediums can include CD-ROM, PC-CARD, memory card, floppy disk, magnetic tape, and a network component. The operating system (OS) 21, other computer code, and data may reside within the storing unit 20. Operating systems are generally well known and will not be described in greater detail. By way of example, the operating system may correspond to Windows, OS/2, DOS, Unix, Linux, Palm OS, and the like. The Operating system can also be a special purpose operating system, such as may be used for limited purpose appliance-type computing devices.

The storing unit 20 may also store application programs (AP) 22 running on the OS 21. Application programs 22 are also generally well known. An application program (sometimes referred to as 'application') is any program designed to perform a specific function directly for a user or, in some cases, for another application program. Examples of application programs include word processors, database programs, Web browsers, development tools, drawing, paint, image editing programs, and communication programs.

The touch system 100 further includes a display device 30 operatively coupled to the processor 10. The display device 30 may be a liquid crystal display (LCD) (e.g., active matrix, passive matrix, and the like). Alternatively, the display device 30 may also correspond to a cathode ray tube (CRT), a plasma display or a display implemented with electronic inks. The display device 30 can be configured to display a graphical user interface (GUI) that provides an easy to use interface between the user and the operating system or application program miming thereon.

The touch system 100 further includes one or more touch devices 40 that are bonded to the display device 30 and operatively coupled to the processor 10. The touch devices 40 may be based on sensing technologies including capacitive sensing, resistive sensing, surface acoustic wave sensing, pressure sensing, optical sensing, and/or the like, and the touch system 100 can be configured to receive input from a user's touch and to send the information to the processor 10. The touch device 40 includes a touch panel 41 and a touch IC 42 coupled to the touch panel 41. The touch panel 41 is configured to acquire touch information of an input gesture, for example, acquire position and magnitude of touches on a touch sensitive surface. The touch IC 42 includes a gesture store module 421 and a determination module 422.

The gesture store module 421 is configured to store predefined universal gesture, as previously described.

The determination module 422 is configured to determine whether an input gesture matches a predefined universal gesture according to the touch information, as previously described.

The touch IC 42 can also be configured to send the event signal to the processor 10 when the input gesture matches the predefined universal gesture, as previously described.

The processor 10 is configured to receive an event signal and determine whether the application program 22 or the operating system 21 is designated to respond to the event signal based on the data of the event signal. For example, calculating the centroid can be a way to determine whether the application program 22 or the operating system 21 is designated to respond to the event signal, as previously described.

By way of example, the processor 10 places the event signal into the event queue (not shown) of the application program 22, when the application program 22 is designated. The application program 22 is controlled by the processor 10 to acquire the event signal from the event queue and then generate a corresponding gesture command set 24 displayed on an interface thereof. The gesture command set 24 may be a map that links actions to gesture events and may include a variety of GUI elements shown by arrow of commands (moves, rotations, spread/contract). It should be understood that the gesture command sets as well as the GUI elements are made by way of example and not by way of limitation. For example, in a photo editor program, the corresponding gesture command set 24 includes commands of scroll through media files, rotation of the photo, zoom in, or zoom out of the photo. It should be understood that, besides the default elements, the users can also custom their own elements. Accordingly, when dealing with various application programs 22, a user can perform a universal gesture to execute multiple associated commands without memorizing complex gestures.

As describe above, when the processor 10 determines that the operating system 21 is designated to respond to the event signal based on the type, area, or position of the event signal, the operating system 21 is controlled by the processor 10 to generate a corresponding gesture command set 24 displayed on an interface thereof.

If the input gesture does not match the universal gesture or if the confirming information of matching with the universal gesture is not valid, touch IC 42 sends the touch information to the processor 10 as a normal signal; and a system command associated with the touch information is performed by the operating system 21 or the application program 22.

Although the invention has been described in language specific to structural features and/or methodological acts, it is to be understood that the invention defined in the appended claims is not necessarily limited to the specific features or acts described. Rather, the specific features and acts are disclosed as sample forms of implementing the claimed invention.

What is claimed is:

1. A gesture recognition method, comprising:
    determining whether an input gesture matches a predefined universal gesture based on touch information on a touch panel;
    determining whether an application program is designated to respond to an event signal, comprising:
        calculating a centroid of contacts, wherein the centroid is defined by coordinate $$\left( \frac{\sum_{i=1}^{n} x_i}{n}, \frac{\sum_{i=1}^{n} y_i}{n} \right),$$

wherein $(X_i, Y_i)$ presents a coordinate of each contact $P_i$, and i=1, 2, 3 ... n, n≥3; and
        determining whether the centroid is positioned within a window area of the application program; wherein, if the result of determining the centroid is true, the application program responds to the event signal; and if the result of determining the centroid is false, an operating system responds to the event signal; and
    generating a corresponding gesture command set based on the event signal when the input gesture matches the predefined universal gesture.

2. The method according to claim 1, wherein if the application program is designated to respond to the event signal, further comprising:
    placing the event signal into an event queue of the application program; and
    acquiring the event signal from the event queue and displaying the gesture command set corresponding to the application program.

3. The method according to claim 1, wherein if the application program is not designated to respond to the event signal, further comprising displaying the gesture command set corresponding to an operating system.

4. The method according to claim 1, wherein the universal gesture grab is performed by at least three fingers.

5. The method according to claim 4, wherein the step of determining whether the input gesture matches the predefined universal gesture based on the touch information comprises:
    determining whether there are at least three contacts on the touch panel at initial time;
    determining, within a first predefined time, whether an area of a polygon bounded by connecting adjacent contacts is in inverse proportion to time if the result of determining the contacts on the touch panel is true;
    identifying the input gesture matching the predefined universal gesture if the area of the polygon is in inverse proportion to time.

6. The method according to claim 5, wherein the step of determining the area of the polygon further comprises:
    determining whether all the contacts remain during the first predefined time; and
    confirming the input gesture matching the predefined universal gesture is not valid if the result of determining all the contacts remaining is false or if the area of the polygon is false.

7. The method according to claim 5, wherein the step of determining whether the input gesture matches the predefined universal gesture based on the touch information further comprises:
    determining whether all the contacts disappear within a second predefined time after the step of identifying the input gesture matching the universal gesture;
    confirming the input gesture matching the universal gesture is valid if the result of determining all the contacts disappearing is true; and
    confirming the input gesture matching the universal gesture is not valid if the result of determining all the contacts disappearing is false.

8. The method according to claim 4, wherein the step of determining whether the input gesture matches the predefined universal gesture based on the touch information comprises:
    determining whether there are at least three contacts on the touch panel at initial time;
    determining, within a first predefined time, whether distance between two adjacent contacts is in inverse proportion to time if the result of determining the contacts on the touch panel is true; and
    identifying the input gesture matching the predefined universal gesture if the distance between two adjacent contacts is in inverse proportion to time.

9. The method according to claim 8, wherein the step of determining the distance between two adjacent contacts further comprises:
    determining whether all the contacts remain during the first predefined time; and
    confirming the input gesture matching the predefined universal gesture is not valid if the result of determining all the contacts remaining is false or the area of the polygon is false.

10. The method according to claim 8, wherein the step of determining whether the input gesture matches the predefined universal gesture based on the touch information further comprises:
    determining whether all the contacts disappear within a second predefined time after the step of identifying the input gesture matching the universal gesture;
    confirming the input gesture matching the universal gesture is valid if the result of determining all the contacts disappearing is true; and
    confirming the input gesture matching the universal gesture is not valid if the result of determining all the contacts disappearing is false.

11. The method according to claim 1, further comprising:
    an operating system performing a system command associated with the touch information when the input gesture does not match the predefined universal gesture.

12. A touch system, comprising:
    a touch panel;
    a touch IC configured to output an event signal when determining an input gesture matches a predefined universal gesture based on touch information on the touch panel; and
    a processor configured to determine whether an application program is designated to respond to an event signal by calculating a centroid of contacts and determining whether the centroid is positioned within a window area of the application program, wherein the centroid is defined by coordinate $$\left(\frac{\sum_{i=1}^{n} x_i}{n}, \frac{\sum_{i=1}^{n} y_i}{n}\right),$$

wherein $(X_i, Y_i)$ represents a coordinate of each contact $P_i$, and i=1, 2, 3 . . . n, n≥3; wherein, if the result of determining the centroid is true the application program responds to the event signal; and if the result of determining the centroid is false, an operating system responds to the event signal;
wherein the processor configured to control the operating system or the application program to generate a corresponding gesture command set according to the event signal.

13. The system according to claim 12, further comprising a storing unit configured to store the operating system and the application program running thereon.

14. The system according to claim 13, wherein the processor places the event signal into an event queue of the application program if the processor determines that the application program is designated to respond to the event signal, and the application program acquires the event signal from the event queue for displaying the gesture command set corresponding to the application program.

15. A computer readable storage medium storing one or more programs, wherein the one or more programs comprising instructions, which when executed by an electronic device with a touch panel, cause the electronic device to:
determine whether an input gesture matches a predefined universal gesture based on touch information on the touch panel;
determining whether an application program is designated to respond to an event signal, comprising:
calculating a centroid of contacts, wherein the centroid is defined by coordinate $$\left(\frac{\sum_{i=1}^{n} x_i}{n}, \frac{\sum_{i=1}^{n} y_i}{n}\right),$$

wherein $(X_i, Y_i)$ represents a coordinate of each contact $P_i$, and i=1, 2, 3 . . . n, n≥3; and
determining whether the centroid is positioned within a window area of the application program; wherein, if the result of determining the centroid is true, the application program responds to the event signal; and if the result of determining the centroid is false, an operating system responds to the event signal; and
generating a corresponding gesture command set based on an event signal when the input gesture matches the predefined universal gesture.

* * * * *